United States Patent
Fay et al.

(10) Patent No.: US 8,021,036 B1
(45) Date of Patent: Sep. 20, 2011

(54) METHOD AND APPARATUS FOR MIXING DOUGH

(75) Inventors: Edward Fay, Wilmette, IL (US); James Fay, Joliet, IL (US); Michael Baron, Joliet, IL (US)

(73) Assignee: CMC America Corporation, Joliet, IL (US)

( * ) Notice: Subject to any disclaimer, the term of this patent is extended or adjusted under 35 U.S.C. 154(b) by 0 days.

(21) Appl. No.: 12/987,337

(22) Filed: Jan. 10, 2011

Related U.S. Application Data

(62) Division of application No. 11/644,082, filed on Dec. 22, 2006, now Pat. No. 7,866,877.

(51) Int. Cl.
B01F 15/06 (2006.01)
B01F 7/02 (2006.01)

(52) U.S. Cl. ................... 366/147; 366/149; 366/325.8

(58) Field of Classification Search .............. 366/144, 366/147, 149, 347, 325.8
See application file for complete search history.

(56) References Cited

U.S. PATENT DOCUMENTS

| | | | | | |
|---|---|---|---|---|---|
| 1,510,165 | A | * | 9/1924 | Temple | 366/99 |
| 1,535,204 | A | * | 4/1925 | Darrah | 366/99 |
| 1,759,289 | A | * | 5/1930 | Van Houten | 366/99 |
| 1,763,292 | A | * | 6/1930 | Eggert | 366/99 |
| 1,957,334 | A | * | 5/1934 | Haas | 426/18 |
| 2,064,758 | A | * | 12/1936 | Kirchhoff | 366/99 |
| 2,084,773 | A | * | 6/1937 | Mason et al. | 366/99 |
| 2,112,927 | A | * | 4/1938 | Pierre | 366/99 |
| 2,145,428 | A | * | 1/1939 | Motta | 366/99 |
| 2,167,316 | A | * | 7/1939 | Spangler et al. | 366/99 |
| 2,301,963 | A | * | 11/1942 | Max Eck et al. | 296/146.9 |
| 3,503,344 | A | * | 3/1970 | Sternberg | 366/99 |
| 3,747,275 | A | * | 7/1973 | May et al. | 49/477.1 |
| 4,275,568 | A | * | 6/1981 | Zielsdorf | 62/342 |
| 4,335,075 | A | * | 6/1982 | Kackos | 422/112 |
| 5,310,569 | A | * | 5/1994 | Muller | 426/504 |
| 5,361,542 | A | * | 11/1994 | Dettloff | 49/477.1 |
| 6,942,224 | B2 | * | 9/2005 | Ludwig et al. | 277/637 |
| 7,866,877 | B2 | * | 1/2011 | Fay et al. | 366/99 |
| 2008/0151682 | A1 | * | 6/2008 | Fay et al. | 366/98 |

* cited by examiner

Primary Examiner — Tony G Soohoo
(74) Attorney, Agent, or Firm — Drinker Biddle & Reath LLP

(57) ABSTRACT

The invention provides an apparatus and method for improved mixing of yeast-raised and yeast-raised type dough. The device and method keep the dough cool by an improved structure and method for circulating coolant around a jacketed bowl, and by circulating cooled air through the spinning agitator roller bars. Better aeration of the dough and faster mixing time are achieved along with full water and flour absorption, and reduced operating temperatures by controlling placing of the agitator driveshaft in a carefully defined region. Finally, the invention provides a wiper for wiping the lip of the bowl to keep it clean of dough and to insure a proper seal along the bowl lip when a resilient, expandable bowl seal is used, and it provides a pneumatic seal for securely sealing the mix ingredients in the bowl during mixing.

19 Claims, 10 Drawing Sheets

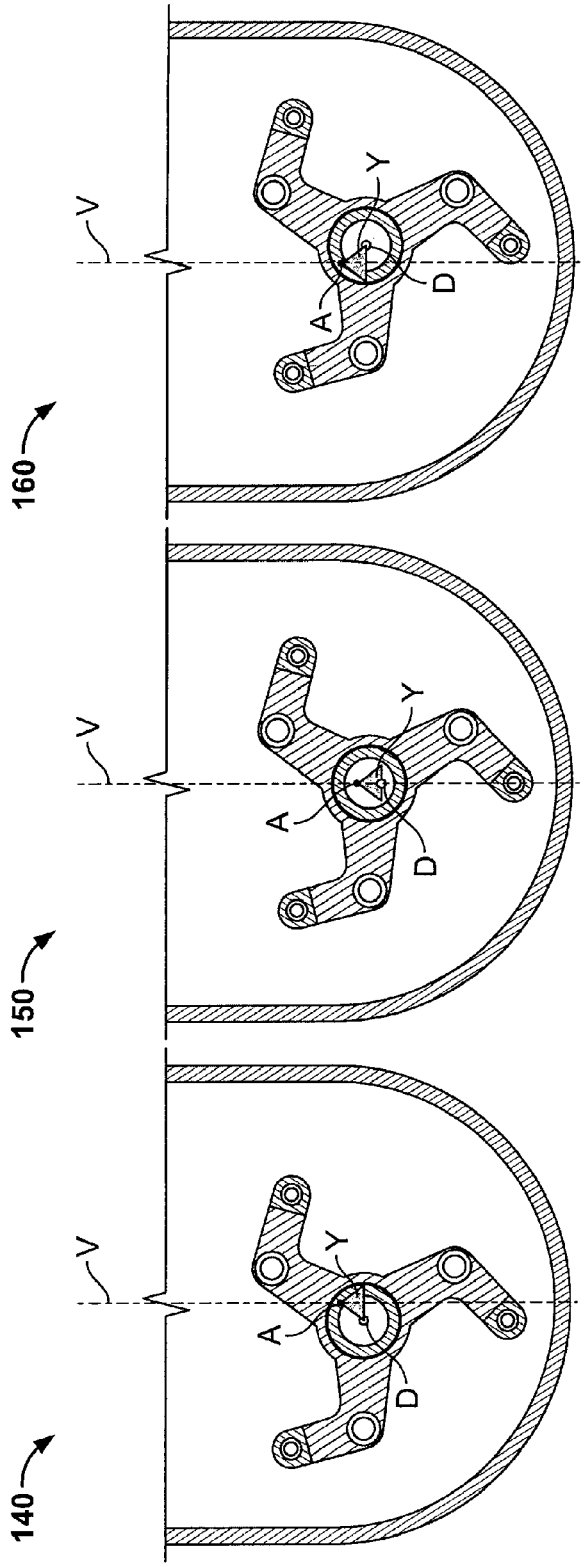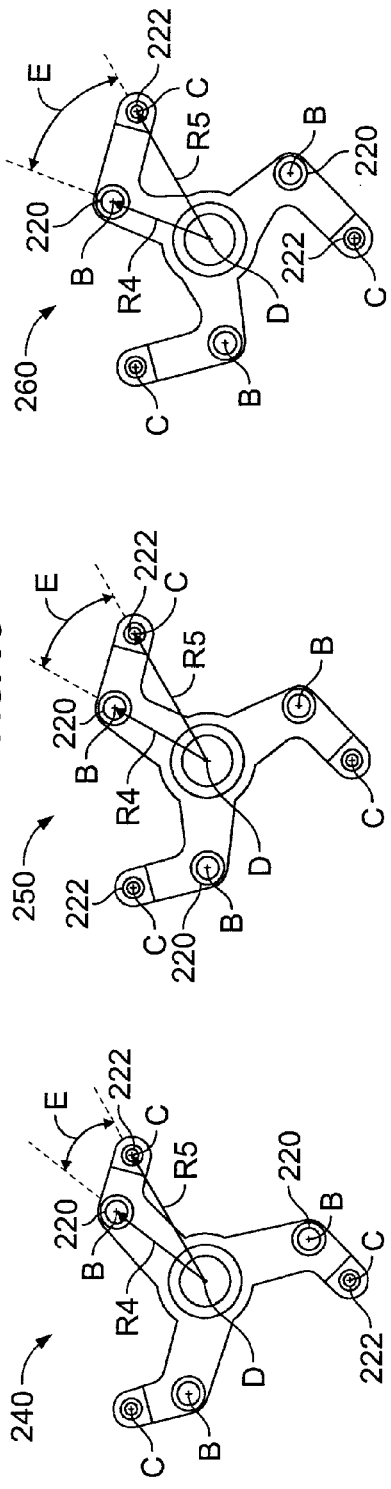
FIG. 3C
FIG. 3D

METHOD AND APPARATUS FOR MIXING DOUGH

FIELD OF THE INVENTION

This invention pertains to yeast-raised and yeast-raised-type dough-mixing machines and to methods of yeast-raised and yeast-raised-type dough mixing.

BACKGROUND OF THE INVENTION

Conventional methods and devices for mixing yeast-raised dough have a number of shortcomings, such as relatively long mix times which result in undesirable higher output temperatures, less than optimal gluten development, and high operating costs. In addition, these conventional methods and devices do not produce uniform aeration of the dough. When conventional devices are run at higher operating speeds to decrease mix time, they produce even poorer aeration of the dough, along with tearing of the dough and even higher dough temperatures.

A need exists, therefore, for improved methods and apparatus for mixing dough that will reduce mixing time, decrease the dough temperature and better aerate the dough. This invention relates to an apparatus and method for achieving optimal gluten development of yeast-raised and yeast-raised-type dough by reducing the mixing time while achieving lower dough temperatures and better aeration of the dough. The benefits of this invention may be achieved with different yeast-raised dough types having different air and water absorption levels and different flour protein levels. Furthermore, because this invention reduces the dough mixing time, it decreases the operating costs per pound of product.

BRIEF SUMMARY OF THE INVENTION

This invention is generally directed to providing improved efficiency and effectiveness in mixing of yeast-raised dough. The apparatus and method of the invention achieve a cooling effect on the dough by way of an improved jacketed bowl structure and method for circulating cooled air around a jacketed bowl. The jacketed bowl has a generally v-shaped channel adjacent to the exterior surface of the bowl to distribute coolant around the exterior surface of the bowl.

The apparatus and method achieve further improved cooling through an improvement made to the agitator that mixes dough in the bowl. While mixing, the agitator rotates around its driveshaft. The agitator's stretcher bars rotate around the agitator driveshaft, and spin in their mountings on the agitator. In the past, it has not been possible to circulate cool air through spinning stretcher bars while the agitator rotates. This invention achieves further improved cooling of dough during mixing by circulating cooled air through the spinning roller bars of the rotating agitator.

In one important embodiment, the present invention achieves better aeration of the dough and faster mixing times at lower operating temperatures while still allowing for full water and flour absorption by positioning the agitator driveshaft in a defined region vis á vis the interior surface of the bowl to ensure a gentle folding and rolling of the dough during mixing. This produces more uniform aeration and less heat than experienced in prior art dough mixing machines.

In another important embodiment of the invention, the distance the roller bars are placed away from the stretcher bars further optimizes the aeration of the dough thereby reducing mixing time and heat build-up.

It is desirable to maintain a good seal between the cover and the top of the bowl during mixing. This has not been successfully done in the past. Thus, in yet another embodiment of the invention a wiper is provided for wiping the lip of the bowl to insure secure sealing of the ingredients in the bowl during mixing.

The invention makes use of solid stainless steel to improve ease of sanitation and decrease cleaning costs for the mixer and the surrounding area of the production facility.

The above and other objects and advantages of the invention will be apparent from the description of the invention provided herein which may be best understood by reference to the following drawings in which embodiments of the invention are illustrated.

BRIEF DESCRIPTION OF THE DRAWINGS

FIG. 3C is a partial cross-sectional view taken on line 2b-2b of FIG. 1B of the agitator in a bowl configured according to one embodiment of the invention and illustrating the placement of the agitator driveshaft in region Y according to an embodiment of the invention.

FIG. 3D is a side view of the spider of three different embodiments of the invention.

DETAILED DESCRIPTION OF THE INVENTION

The invention is generally directed to a device and method of mixing yeast-raised and yeast-raised-type dough. The following examples further illustrate the invention but, of course, should not be construed as in any way limiting its scope.

Figure 1A:
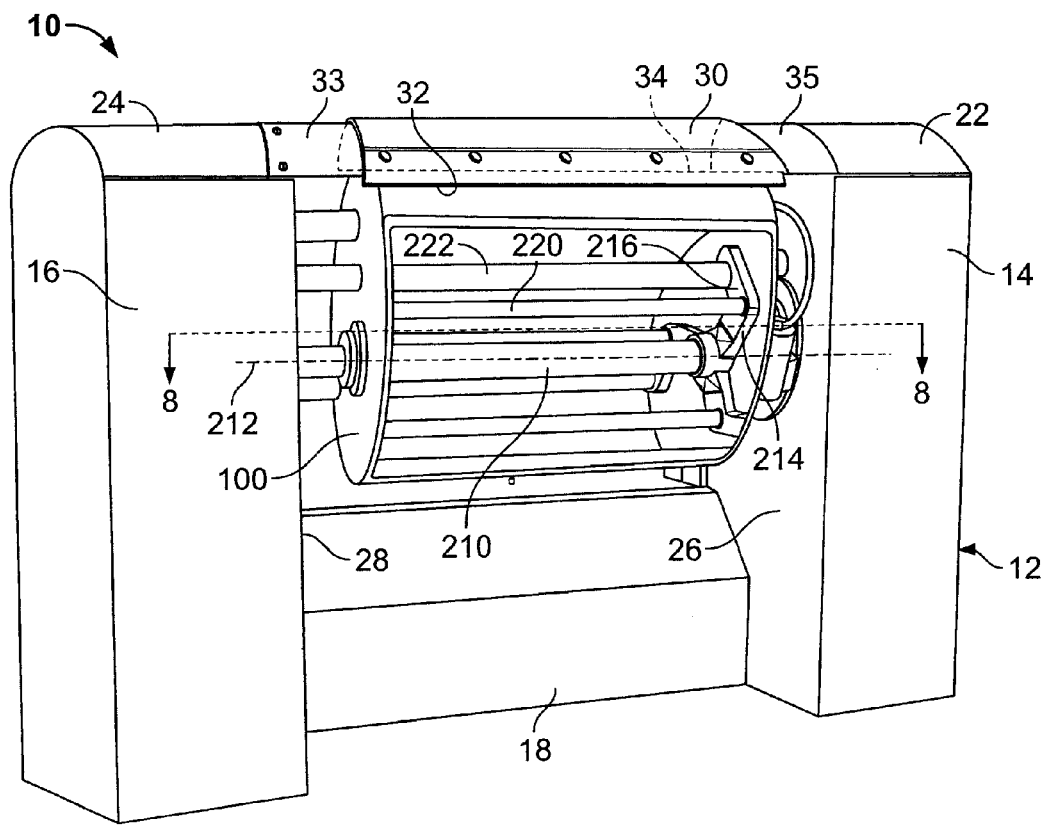
FIG. 1A is a perspective view of a mixer configured according to an embodiment of the invention with the mixer bowl in a dumping position.

FIG. 1A illustrates an embodiment of a mixer, generally labeled 10, for mixing dough according to the method of this invention. The mixer 10 includes a frame 12 on which the mechanical components are disposed. Although not limited to this material, the frame may be made of solid stainless steel plates such that there are no corrosion sensitive materials in any part of the frame. In one preferred embodiment, the frame may be made of #304 solid stainless steel plates. Use of solid stainless steel plates, as opposed to a layer of stainless steel veneered over a core of another material, provides greater stability to the mixer while mixing dough, and improves the overall sanitation and ease of maintenance of the apparatus because solid stainless steel is corrosion-free. The mixer can be sprayed down with a cleaning liquid such as water without fear of corrosion forming on the mixer once a veneer of stainless steel has worn away and portions of an underlying corrosion sensitive core are exposed.

Figure 1B:
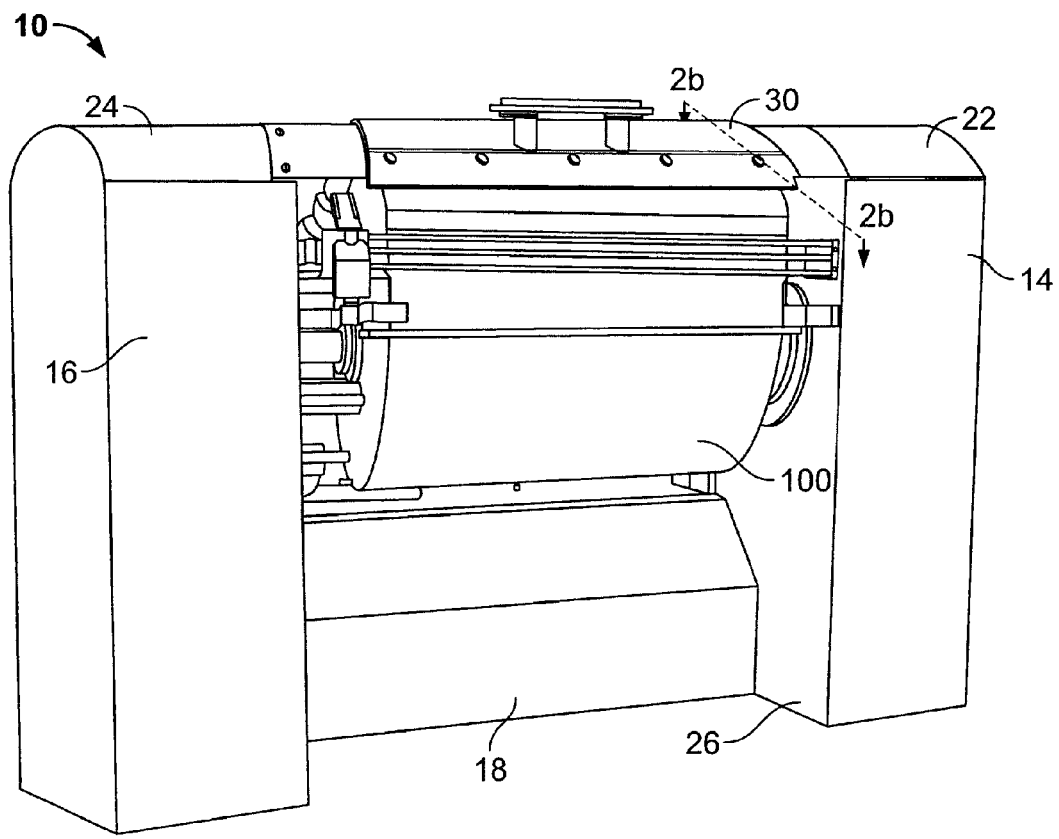
FIG. 1B is a perspective view of a mixer configured according to an embodiment of the invention with the mixer bowl in an upright position.

As shown in FIGS. 1A-1B, the frame 12 comprises a right leg casing 14 and a left leg casing 16, disposed on either end of a support casing 18. Each leg casing has a top (respectively, 22 and 24) and an inner side wall (respectively, 26 and 28). A cover 30 is adjacent the frame and extends between the top (22, 24) of the right and left leg casings (14, 16) and may overlap a portion of each top (22, 24). A drive motor and an associated gear reducer (not shown) are disposed inside the support casing 18 and are mounted on plates that may be approximately ¼ inch to 2½ inches.

As shown in FIGS. 1A-1B, the mixer also includes a bowl 100. In FIG. 1A, the bowl 100 is shown in a dumping position. In FIG. 1B, the bowl 100 is in an upright position. The bowl 100 may be made of solid stainless steel, however, any other material suitable for use when mixing dough for human consumption may be used. In one embodiment, the bowl 100 may be made of #304 solid stainless steel.

An agitator driveshaft 210 is rotatably mounted within the bowl 100 and passes through the inner side wall (26, 28) of each leg casing (14, 16) and defines a driveshaft axis 212. An agitator (generally marked 200 in FIG. 2A) is fixed to the agitator driveshaft 210 which rotates the agitator 200 as discussed below. The agitator driveshaft may be made of stainless steel. In one embodiment the agitator driveshaft may be made of #304 stainless steel.

Typically, different agitator designs are required for dough types with different absorption levels, flour protein levels and other formula variations. This often results in mixers that are customized for use with only one particular agitator design and, hence, only one particular dough type. The mixer of the present invention can accommodate various types of dough and can improve the mixing characteristics for each dough type by changing the agitator position within the mixing bowl and/or changing the agitator design to optimize performance, reduce mix time, improve aeration characteristics, and improve gluten alignment characteristics.

Figure 2A:
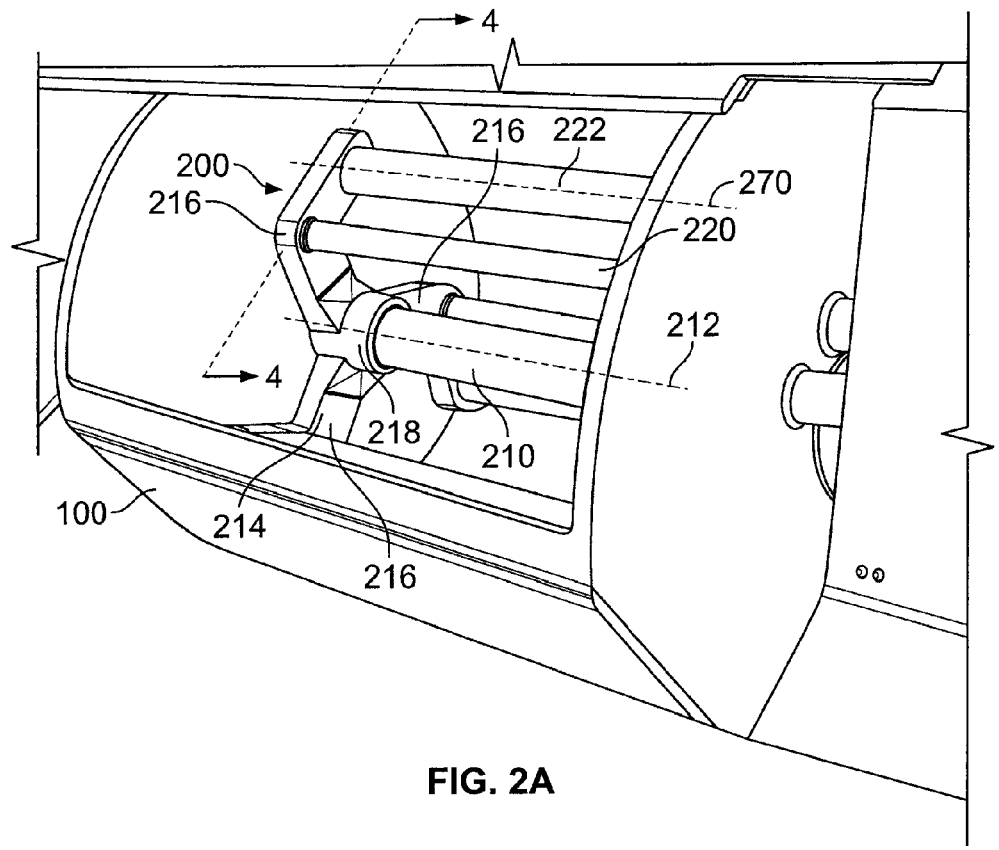
FIG. 2A is a perspective view of an agitator and a bowl configured according to an embodiment of the invention.
Figure 2B:
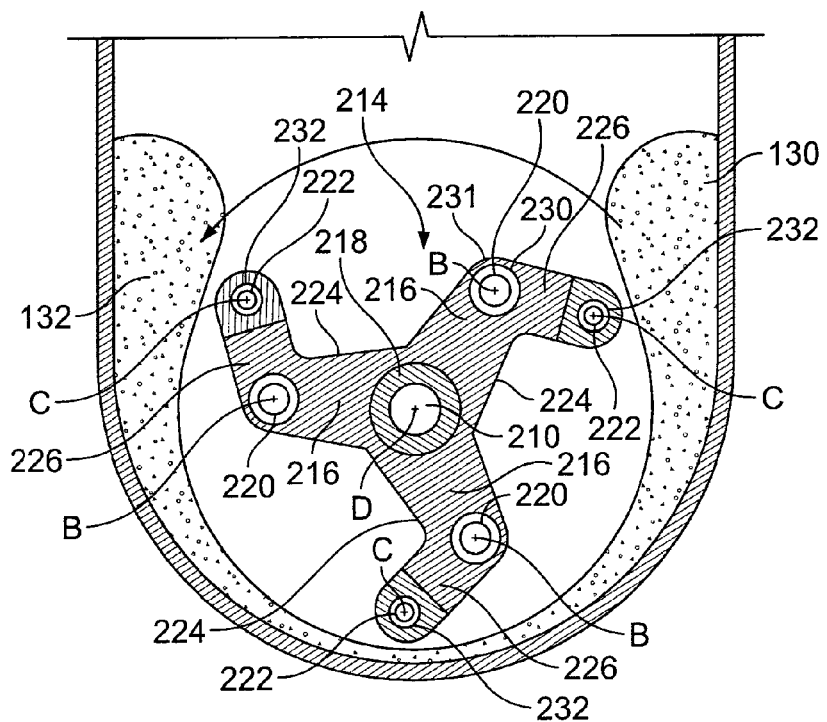
FIG. 2B is a partial cross-sectional view taken on line 2b-2b of FIG. 1B of an agitator in a bowl configured according to an embodiment of the invention.

As shown in FIGS. 2A-2B, the agitator 200 is comprised of spiders 214 each with spider arms 216 radiating from a central hub 218, stretcher bars 220 (as discussed below), and roller bars 222 (as discussed below). In one embodiment, as illustrated in FIGS. 2A-2B, the agitator 200 may have two spiders 214 each with three spider arms 216. Greater or fewer spider arms may be used in other embodiments. The stretcher bars 220 and the roller bars 222 are disposed between the spiders 214 and are oriented substantially parallel to the agitator driveshaft 210. A center point "B" is disposed substantially at the midpoint of the diameter of each stretcher bar 222. The center points B of the stretcher bars 220 may be generally evenly spaced at 120 degrees apart from each other. A center point "C" is disposed substantially at the midpoint of each roller bar. The center points C of the roller bars 222 may be generally evenly spaced at 120 degrees apart from each other. The spiders 214 are mounted on the agitator driveshaft 210 and a spider arm 216 is attached at each end of the stretcher bars and roller bars (220, 222). Although not limited to this material, the spiders 214, the stretcher bars 220, and the roller bars 222 may be made of cast stainless steel. In one embodiment, the spiders 214, the stretcher bars 220, and the roller bars 222 may be made of cast #304 stainless steel.

As illustrated in FIG. 2B, each spider arm 216 has a finger portion 226 arranged at an inclined angle relative to an inner edge 224. In one embodiment, the angle between each inner edge 224 and the finger 226 is substantially an obtuse angle, and each angle is substantially the same. In other embodiments, an angle other than an obtuse angle may be used. As illustrated in FIG. 2B, a boss 230 is attached to each finger adjacent to the pivot point 231 on the spider arm 216. The stretcher bars 220 are mounted on these bosses 230. The end of each finger 226 is provided with a bushing 232 for holding roller bars 222. Each bushing is held in place by a bearing cap secured by bolts. The tubular roller bars 222 are enclosed at their ends by split, bolted hubs. Each end of each tubular roller bar 222 has a journal which fits into the bushings 232 so that each roller bar 222 is freely movable and rotates around the driveshaft axis 212 and spins in its (the roller bar) mounting around a roller axis 270 substantially parallel to the driveshaft axis 212. The stretcher bars 220 may be fixed in some embodiments, and in others, may be allowed to spin on bushings. In the embodiment depicted in FIGS. 1A and 2A, there are three stretcher bars 220, three roller bars 222, and three radiating spider arms 216 on the spiders 214. In other embodiments, there may be fewer or more stretcher bars 220 or roller bars 222.

Figure 3A:
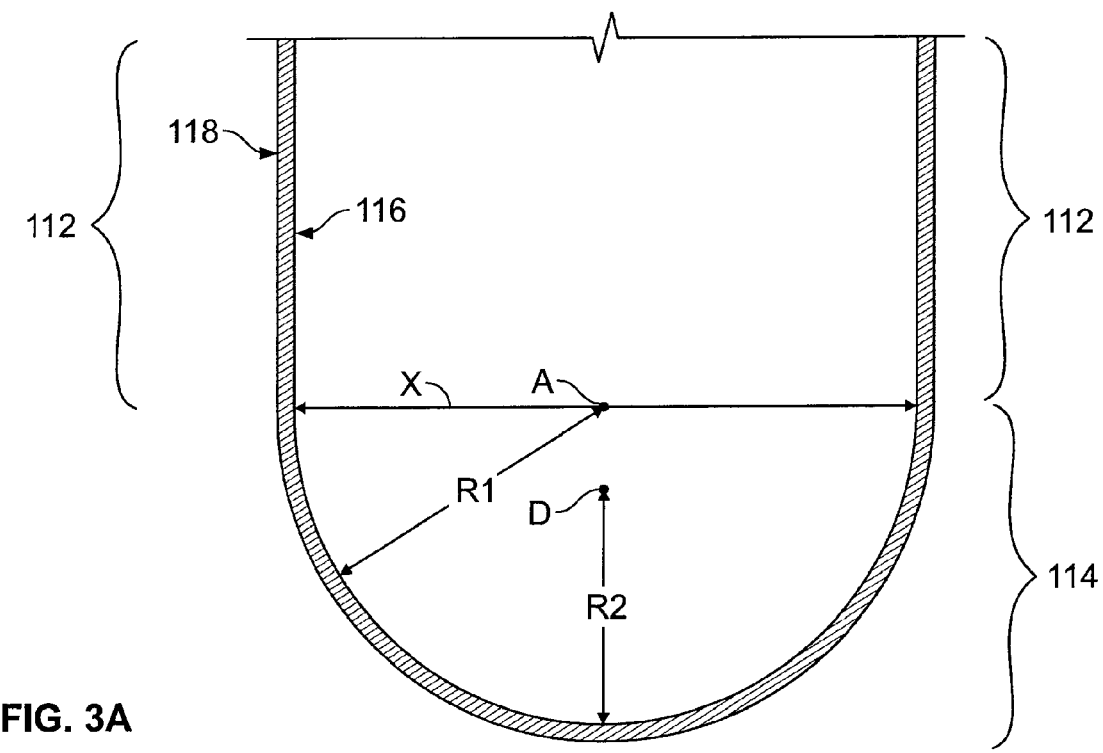
FIG. 3A is a partial cross-sectional view taken on line 2b-2b of FIG. 1B of a bowl (with the agitator removed) configured according to one embodiment of the invention illustrating A, R1, R2, and D.

FIG. 3A illustrates a cross-sectional view of one embodiment of the bowl 100. The bowl 100 is defined by two parallel sides 112 adjacent to a semicircular base 114. The diameter of the semicircular base is designated as "X." The midpoint of the diameter X of the semicircular base 114 is designated as "A." The bowl is comprised of an interior bowl surface 116 and an exterior bowl surface 118. The radius "R1" of the semicircular base 114 extends from the midpoint A to the interior bowl surface 116 of the semicircular base 114. "D" is the center point of the agitator driveshaft 210. In one embodiment, the driveshaft center point D is disposed below the midpoint A such that the agitator driveshaft distance "R2," the distance between D and the interior bowl surface 116 of the semicircular base 114, is about 72% to about 97% of the radius R1. The length of R2 may vary, depending on the formula and the absorption level of the dough to be mixed; the aeration characteristics of higher absorption dough improves when D is positioned closer to A, and the aeration characteristics of lower absorption dough improves when D is positioned farther away from A.

Figure 3B:
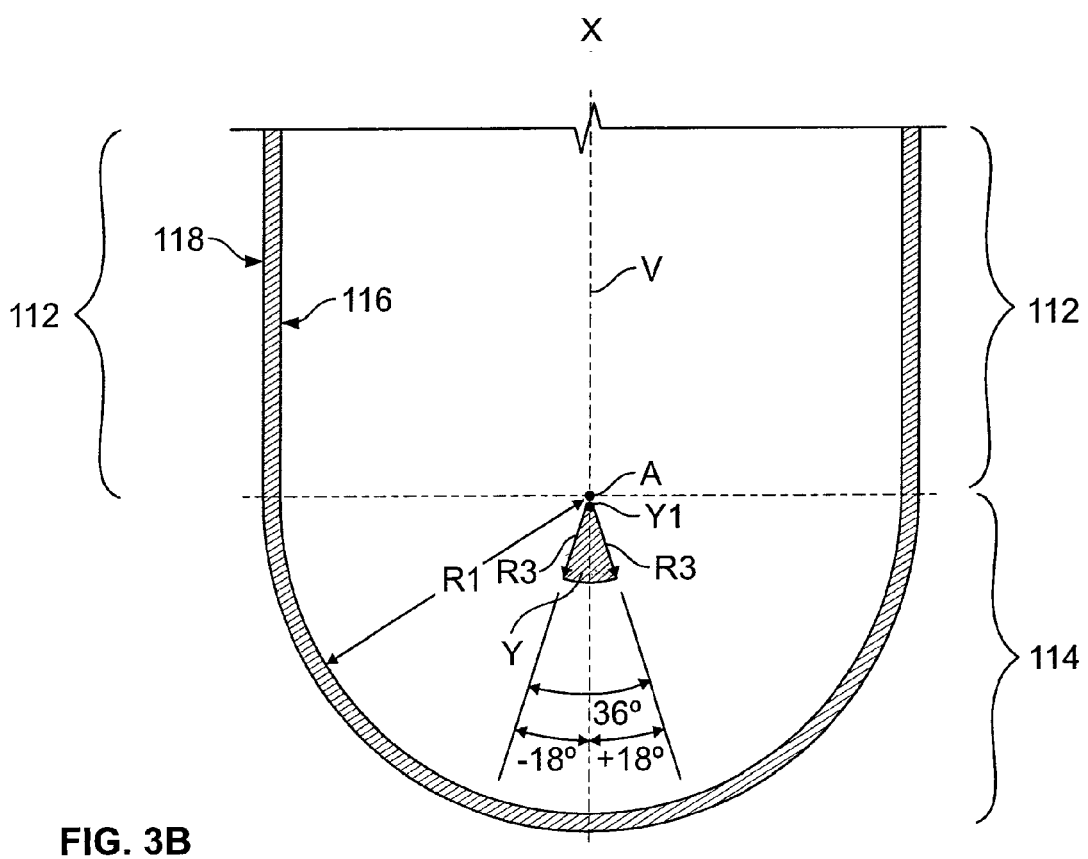
FIG. 3B is a partial cross-sectional view taken on line 2b-2b of FIG. 1B of a bowl (with the agitator removed) configured according to one embodiment of the invention illustrating region Y.

The vertical axis in the bowl 100 is designated as "V." In another embodiment of the invention, the placement of D may be moved forward or backward from the vertical axis V within the region shown as "Y" in FIGS. 3B-3C. The region Y is a sector of approximately 36° defined by a vertex point Y1, which is disposed a distance of approximately 3% of R1 directly below midpoint A, and a radius R3 of approximately 25% of R1 radiating outward from Y1, toward the interior bowl surface 116 of the semicircular base 114. As illustrated in FIG. 3B, the region Y is centered on the vertical axis V and extends approximately +18° from the vertical axis V and approximately −18° from the vertical axis V for a total combined angle of approximately 36°.

Changing the position of the agitator driveshaft 210 (FIG. 2B) center point D improves the aeration characteristics of the mixing process by changing the outline of the compression zone 132 (FIG. 2B) and the outline of the decompression zone 130 (FIG. 2B) around the agitator 200. The most desirable location of the agitator driveshaft 210 center point D in region Y depends on the absorption level of the dough. For instance, for dough having low absorption characteristics, D may be disposed, in region Y, in the range of 0° to −18° from the vertical axis V. For the lowest-absorption dough type, D should be disposed, in region Y, approximately −18° from vertical axis V toward the rear of the bowl. For dough having high absorption characteristics, D may be disposed, in region Y, in the range of 0° to +18° from the vertical axis V. For dough having the highest absorption characteristics, D should be disposed approximately +18° from the vertical axis V. The entire region Y is an area of potential points where the driveshaft center point D of the agitator driveshaft 210 may be optimally located.

FIG. 3C illustrates three exemplary positions of the driveshaft center point D in the region Y. The dough forms generated by placement of the agitator driveshaft 210 driveshaft center point D in the Y sector allow for higher operating RPMs of the agitator without causing gluten degradation in the dough or excess heat generation, and without causing mechanical vibrations in the mixer that reduce mixer component and bearing life cycles. In the first illustration in FIG. 3C, generally labeled 140, the agitator driveshaft 210 center point D is shown in region Y disposed for the lowest type of absorption dough. D is disposed approximately −18° from vertical axis V toward the rear of the bowl. In the third illustration in FIG. 3C, generally labeled 160, the agitator driveshaft 210 center point D is shown in region Y disposed for the highest type of absorption dough. D is disposed approximately +18° from vertical axis V toward the front of the bowl. In the second illustration in FIG. 3C, generally labeled 150, the agitator driveshaft 210 center point D is shown in region Y disposed for an average type of absorption dough. D is disposed approximately near the V axis.

For high-absorption through low-absorption yeast raised dough types, the agitator design may be modified for better performance and higher mixer RPMs by varying the position of the stretcher bars. For high-absorption dough, which is softer and has an extended dough form during mixing, the agitator may use spiders with high-lead stretcher bars 240 to increase the tumbling and rotation of the dough mass as it orbits around the agitator driveshaft 210. As shown in FIG. 3D, the radius "R5" is the distance between D and the center point C of the roller bars 222. The radius "R4" is the distance between D and the center point B of the stretcher bars 220. For spiders with high-lead stretcher bars, R4 is about 0.80R5 to about 0.84R5 and the angle "E" substantially between B and C is about 20 degrees to about 30 degrees. The vertex for E is disposed on the driveshaft center point D. For average-absorption dough, the agitator may use spiders with mid-lead stretcher bars 250. For spiders with mid-lead stretcher bars, R4 is about 0.71R5 to about 0.75R5 and the angle "E" substantially between B and C is about 25 degrees to about 35 degrees. The vertex for E is disposed on the driveshaft center point D. For low-absorption dough, which is stiffer, heavier, and maintains a more compact dough form during mixing, the agitator may use spiders with low-lead stretcher bars 260 to increase the tumbling and rotation of the dough mass as it orbits around the agitator driveshaft 210. In spiders with low-lead stretcher bars, R4 is about 0.62R5 to about 0.66R5 and the angle "E" substantially between B and C is about 30 degrees to about 40 degrees. The vertex for E is disposed on the driveshaft center point D. FIG. 3D illustrates these three variations of the agitator design.

For dough having the highest absorption characteristics, the combination of an agitator with spiders designed for high-lead stretcher bars 240, and placement in region Y of D approximately +18° from the vertical axis V at the lowest point in region Y, where R2 is approximately equal to 72% of R1, generates the optimum mixing performance. For dough having average absorption characteristics, the combination of an agitator with spiders designed for mid-lead stretcher bars 250, and placement in region Y of D approximately on the vertical axis V at the lowest point in region Y, where R2 is approximately equal to 72% of R1, generates the optimum mixing performance. For dough having the lowest absorption characteristics, the combination of an agitator with spiders designed for low-lead stretcher bars 260, and placement in region Y of D approximately −18° from the vertical axis V at the lowest point in region Y, where R2 is approximately equal to 72% of R1, generates the optimum mixing performance.

Figure 4:
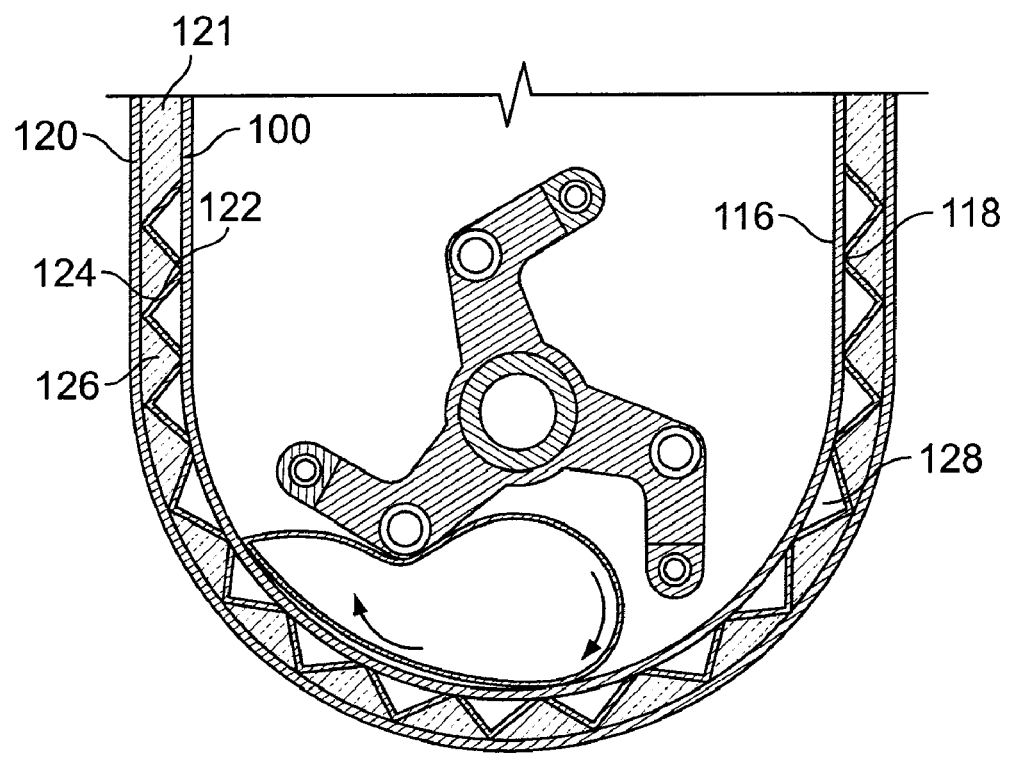
FIG. 4 is a cross-sectional view taken on line 4-4 of FIG. 2A of a bowl and jacket configured according to one embodiment of the invention.

According to another embodiment of the invention, a jacket and channels may be attached to a portion of or to the entire bowl 100 for optimized cooling of the dough while mixing. In this alternative embodiment, as shown in FIG. 4, a cavity 121 is defined between the exterior bowl surface 118 and a bowl jacket 120 surrounding at least a portion of the bowl 100. One or more member(s) 122 are disposed in cavity 121. The members 122 form a flow channel 124 adjacent to the exterior bowl surface 118. In a preferred embodiment, the members 122 may be angle irons. The members 122 may be attached to the exterior bowl surface 118 by flux-core, inert gas welding.

Figure 5:
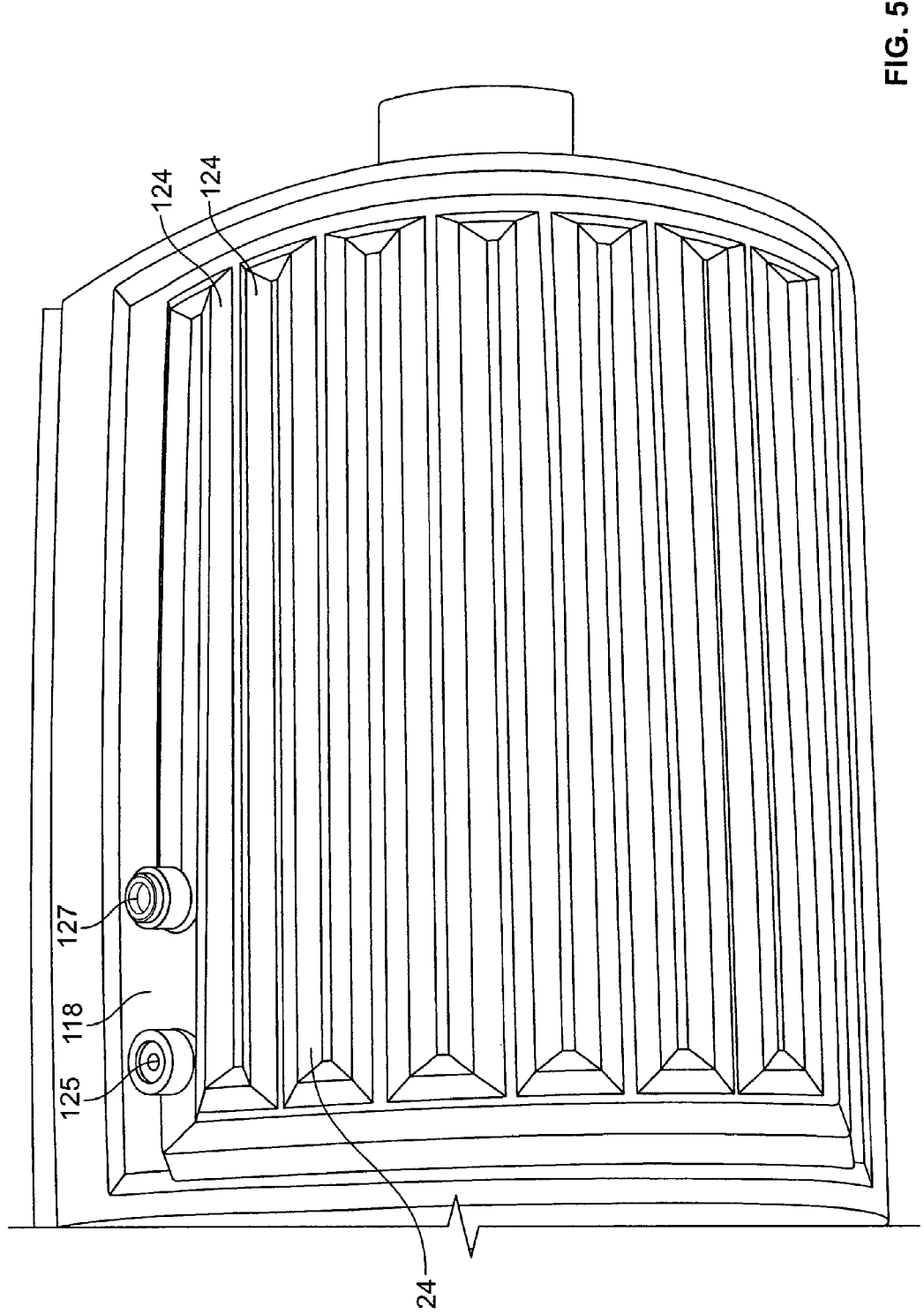
FIG. 5 is a perspective view of the channels disposed on the exterior bowl surface according to one embodiment of the invention.

In one embodiment, as illustrated in FIGS. 4-5, the channel 124 winds back and forth horizontally across at least a portion of the exterior bowl surface 118 in a serpentine configuration. In other embodiments, the channel 124 may wind around the entire exterior bowl surface in a spiral configuration, or the channel 124 may be disposed on the exterior bowl surface 118 in a configuration other than spiral or serpentine. Although not limited to this material, the channel 124 may be made of stainless steel. In one embodiment, the channel 124 may be made of #304 stainless steel. In the embodiment illustrated in FIGS. 4-5, there is a single continuous channel 124 disposed adjacent to the exterior bowl surface 118. Inside the channel 124, coolant 128 maintained at a desired cooling temperature circulates. The circulating coolant 128 reduces the temperature of the bowl 100 and the dough (not shown) being mixed in the bowl 100. For example, 2000-lb. mixers have discharged dough at a temperature as low as 59° F. (15° C.) using coolants with a temperature of 15° F. (−10° C.). In one embodiment of the invention, glycol is used as a coolant, however, any coolant suitable for use with food-processing equipment may be used. The coolant enters one end 125 of the channel 124, circulates through the entire channel 124, and goes out the other end 127 of the channel 124. A pump or other means may be used to circulate the coolant 128 through the channel 124.

The channel 124 is generally V-shaped. To optimize the cooling performance, the V-shape may have approximately a 90-degree angle at its vertex. The V-shaped channel design distributes the pressure of the circulating coolant 128 such that more pressure is focused on the vertex and less pressure is focused on the welds. The V-shaped channel also helps minimize flexing of the bowl 100 during mixing, thereby reducing hardening of the welds applied to the channel 124. Finally, the V-shaped design of the channel 124 increases the turbulence of the coolant 128 as it flows through the channel 124, and thereby increases the thermal transfer to the dough inside the bowl 100.

Insulating material 126 may be is disposed in the cavity between the channel 124 and the bowl jacket 120. Preferably, the insulating material 126 is expanded urethane foam. The insulating material 126 and the bowl jacket 120 help prevent condensation from forming on the outside of the bowl and dripping onto the production floor of the facility where the mixer is installed. Although not limited to this material, preferably, the bowl jacket 120 is a welded stainless steel sheet attached to the bowl. In one embodiment, the bowl jacket 120 may be made of #304 stainless steel.

Figure 6B:
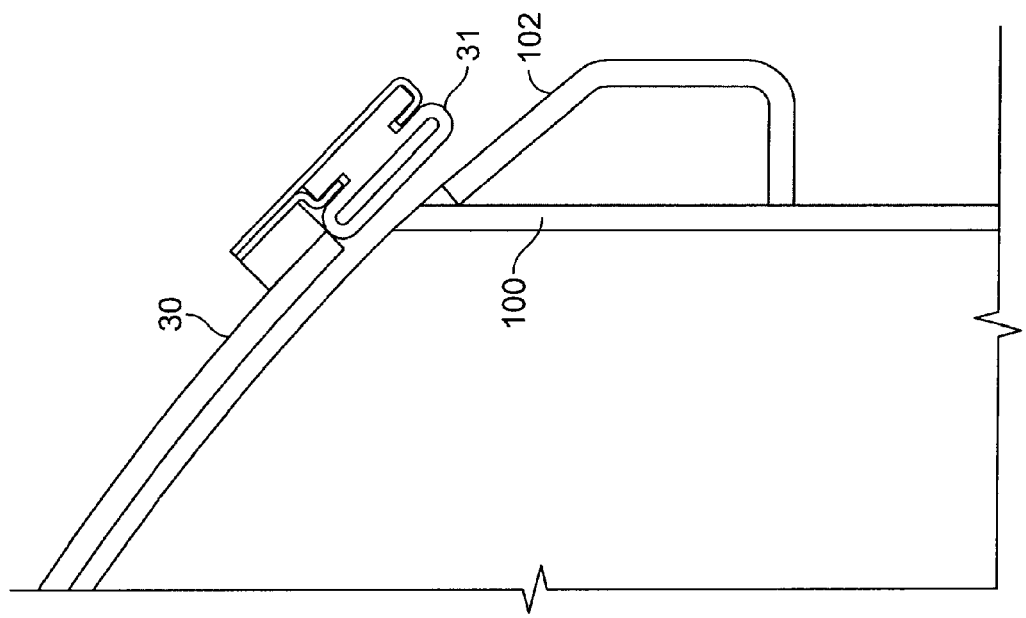
FIG. 6B is a partial cross-sectional view of the cover and the retracted bowl seal configured according to an embodiment of the invention.
Figure 6A:
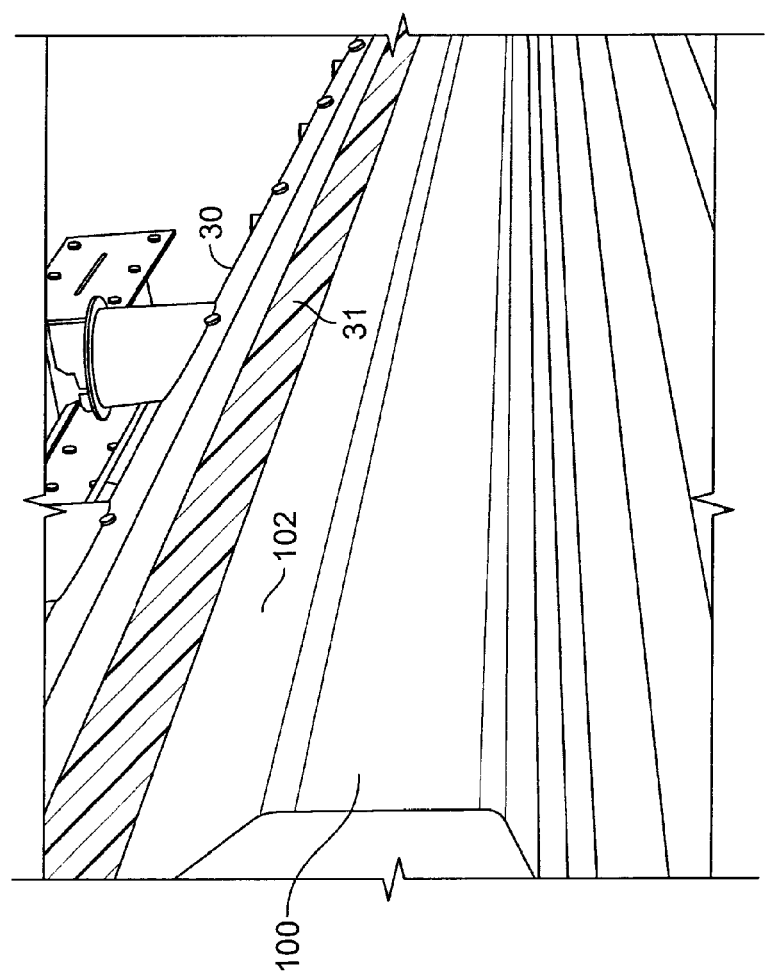
FIG. 6A is a front perspective partial view of the cover and the bowl seal configured according to one embodiment of the invention.

As illustrated in FIG. 1A, the cover 30 has a front edge 32 and back edge 34. Attached to the cover are a left extension 33 and a right extension 35. The cover 30 and its extensions (33, 35) span the distance between the tops (22, 24) of the leg casings. Although not limited to this material, the cover 30 may be made of solid stainless steel plates. In one embodiment, the cover may be made of #304 solid stainless steel plate. In one embodiment, the cover 30 ands its extensions (33, 35) may be bolted to each top (22, 24). Disposed along at least one edge of the cover 30 is an inflatable bowl seal 31 as shown in FIG. 6A. The bowl seal 31 is resilient and expandable. The bowl seal 31 may comprise an inflatable bladder. In one embodiment, a bowl seal 31 may be disposed on the front edge 32 and on the back edge 34 of the cover 30 and may extend across the opening of the bowl 100. The bowl seal 31 may be pneumatically filled with air when the agitator 200 is operating so that it expands to fill the gap between the cover 30 and the bowl 100, thus preventing migration of flour dust, water, and other ingredients out of the bowl 100. Upon completion of mixing, the bowl seal 31 deflates and retracts away from the bowl 100, as illustrated in FIG. 6B. The bowl seal 31 is easily removable for periodic cleaning. In the embodiment shown in FIG. 6B, a bowl lip 102 is disposed adjacent to the top of the bowl 100. The bowl lip 102 may be adjacent to a portion of the perimeter of the top of the bowl 100 or adjacent to the entire perimeter of the top of the bowl 100.

Figure 7A:
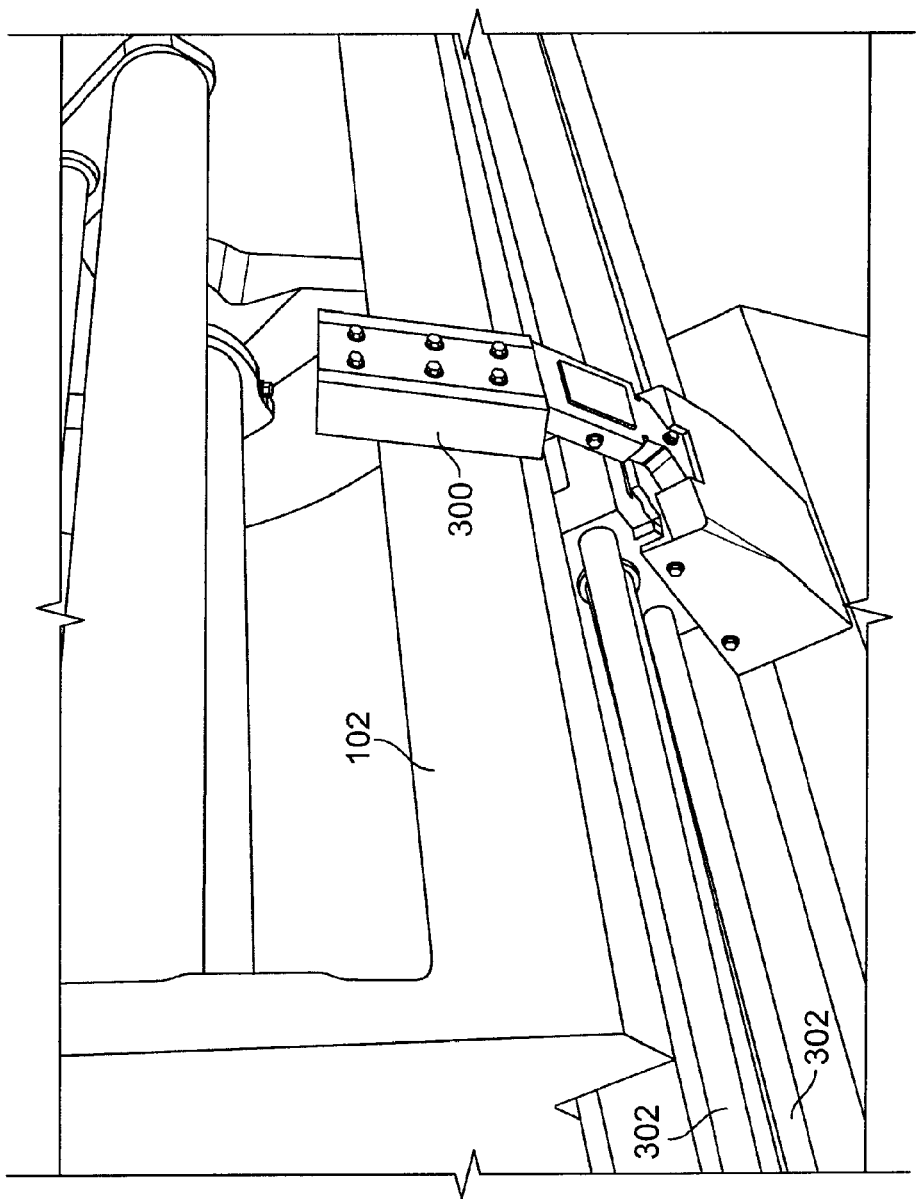
FIG. 7A is a perspective partial view of the wiper configured according to an embodiment of the invention.

The mixer 10 may include a wiper 300 laterally movable along at least one rod 302. In the particular embodiment illustrated in FIG. 7A, there are two rods 302 mounted to the bowl 100; the wiper 300 is mounted adjacent to the bowl 100 on the rods 302 and moves laterally on the rods 302 across the bowl lip 102 of the bowl 100. The rods 302 are attached in a substantially horizontal position to the bowl 100. The movement of the wiper 300 across the bowl lip 102 reduces the amount of dough remnants on the bowl lip 102 (deposited by pouring of the dough) and, thus, improves the seal between the bowl lip 102 and the bowl seal 31.

Figure 8:
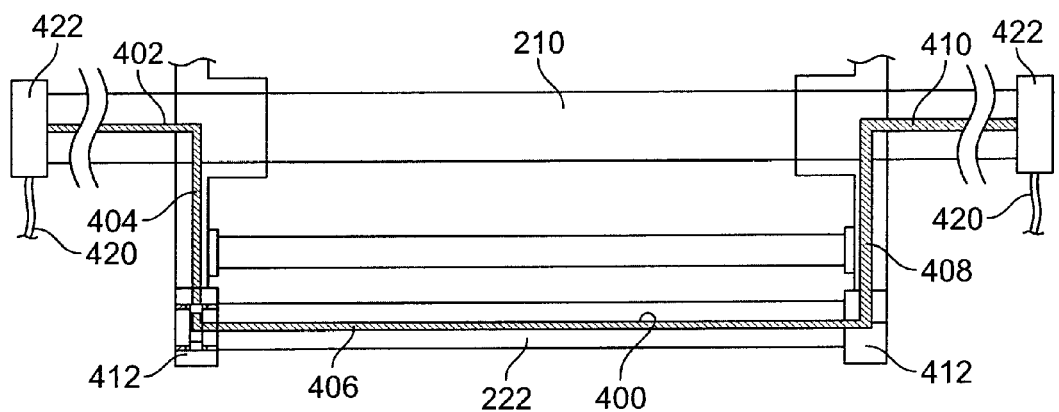
FIG. 8 is a partial cross-sectional view taken on line 8-8 of FIG. 1A of the agitator cooling passageway configured according to an embodiment of the invention.
Figure 9A:
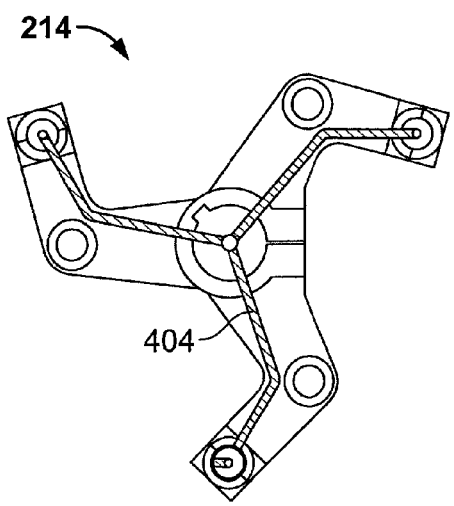
FIG. 9A illustrates an embodiment of a spider defining a spider arm entry passageway.
Figure 9B:
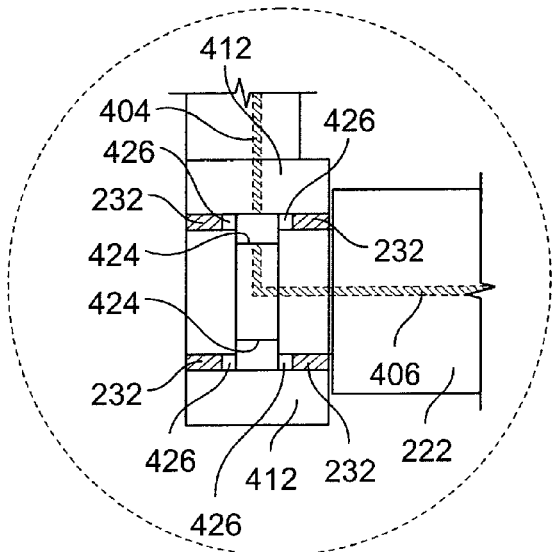
FIG. 9B illustrates the transition from a spider arm entry passageway to a roller bar passageway.

In one embodiment of this invention, cooled air at positive pressure or a combination of compressed inert gas and air is circulated through an interconnected cooling passageway 400 illustrated in FIG. 8 as comprising a shaft entry passageway 402, a spider arm entry passageway 404, a roller bar passageway 406, a spider arm exit passageway 408, and a shaft exit passageway 410. The agitator driveshaft 210 may define a shaft entry passageway 402, and a shaft exit passageway 410. A first spider may define a spider arm entry passageway 404. A second spider may define a spider arm exit passageway 408. In this invention, the term "air," when used in reference to the agitator or the cooling passageway, refers to chilled air, or alternatively to a combination of compressed inert gas and air. The shaft entry passageway 402 is connected to at least one spider arm entry passageway 404. The shaft exit passageway 410 is connected to at least one spider exit passageway 408. Each roller bar 222 may define a roller bar passageway 406 connected between a spider arm entry passageway 404 and a spider arm exit passageway 408. The combination of the roller bars extending and aligning the gluten structures in the dough without tearing as the roller bars spin, and the flowing of cooled air through the cooling passageway 400, provides for superior mixing capabilities while reducing the heat generated by the agitator. For illustrative purposes, FIG. 9A illustrates an embodiment of a spider 214 defining a spider arm entry passageway 404. FIG. 9B illustrates the transition from a spider arm entry passageway 404 to a roller bar passageway 406.

As shown in FIGS. 8-9B, in a preferred embodiment, the shaft entry passageway 402, the spider arm entry passageway 404, and the roller bar passageway 406 will be smaller in diameter than the spider arm exit passageway 408 and the shaft exit passageway 410 in order to reduce back pressure and improve air circulation. The journal at each end of each roller bar 222 has a groove 424. A first groove (FIG. 9B) is aligned, inside the roller bar hub, with the passage through the spider arm to assist with the flow of circulating chilled air from the spider arm entry passageway 404 to the roller bar passageway 406. The first groove allows access of the air flow from the spider arm entry passageway 404 to the roller bar passageway 406 at substantially all points of rotation of the roller bar 222. Similarly, a second groove, at the other end of the roller bar, is aligned, inside the roller bar hub, with the passage through the spider arm to assist with the flow of circulating chilled air from the roller bar passageway 406 to the exit spider passageway 408 at substantially all points of rotation of the roller bar 222. Removable seals 426 disposed adjacent to hub 412 prevent migration of chilled air. In one embodiment, a means for pumping the cooled air into the cooling passageway 400 may be used. One example of such a means is a cooling heat exchange unit that is used to pump the cooled air into the cooling passageway 400. The heat exchange unit may be a glycol chiller with a fan that circulates the chilled air. Air with a temperature as low as 20° F. (7° C.) may be used with either the expanded gas and air combination, or the chilled air. This design allows either clean cooled air to circulate and chill the agitator, or the use of an expansion valve to harness the latent heat of expansion of the inert gas/air mixture to provide for the cooling effect on the circulated air. Lines 420 providing air, or a combination of gas and air may be connected to the agitator driveshaft 210 by a rotary connection 422. An expansion valve, if used, may be disposed adjacent the rotary connection 422.

This invention may utilize an independent, coupled drive motor and reducing gearbox combination, which is oriented horizontally to the mixer in order to lower the center of gravity of the overall mixer mechanical platform. An independent drive motor coupled to an independent gearbox allows for faster, easier maintenance with lower inventory expenses for bakers because when the motor requires removal for maintenance, this can be easily achieved without removing the gearbox and vice versa. This independent coupled design dramatically increases platform stability, rigidity, and maintenance of the alignment of all mechanical drive components due to this improved design. The horizontal orientation of the drive motor aids in improved life of the motor and gearbox shaft seals, which prevents leaking of lubricants into the motor and dough preparation areas.

This invention may use a Gates synthetic KEVLAR-geared, belt-driven system that reduces lubrication requirements, noise generation, alignment requirements, and maintains a cleaner mixer and production area by avoidance of lubrication requirements. A large diameter flanged hub with tapered-locked bushing inserts may be positioned on both sides of the belt-driving sprocket. The tapered-locked bushing inserts ensure that the drive belt does not come off of the driving sprocket at any time during regular operation.

Programmable Logic Controllers, in tandem with Variable Frequency Drive (VFD) systems, allow for control and monitoring of the electrical motors and drive systems. This invention may use a high-efficiency AC motor controlled by a VFD, to allow mixing speeds from 40 to 200 RPMs. In most mixers, applications at these rates cause severe, gluten degradation and tearing of the dough, as well as heat build up and poor aeration of the dough. The key design elements of this invention allow higher operating speeds, with gentle gluten alignment and development, while minimizing heat generation, and optimizing aeration or uniform air incorporation into the dough.

This invention may use hydraulic cylinders and actuators to effect the bowl 100 rotation for receiving ingredients and pouring of finished dough. The bowl 100 preferably will rotate on a heavy trunnion mounted in manganese bronze-bearing blocks. The rotational torque may be delivered by Parker Actuators driven by an electric hydraulic pump through a valve/regulator/solenoid stack. The heavy coupling or eccentric arm may be bolted or attached to the bowl trunnion with self-aligning couplers and preferably will affect a one-direction tilt to 140 degrees forward only or a dual-direction tilt to approximately 140 degrees forward and backward. Pneumatically operated bowl locks are engaged to support the bowl when operating in the upright mix position. A plate is used to mount the actuator to its support bracket in a manner that allows alignment and placement stability, even in the absence of the bracket-mounting bolts. This improves the ease of maintenance.

Preferably there will be at least two banks of zerk lubrication points on the frame 12 to allow easy, regular access to the main lubrication points of the mixer 10, without interruption of mixer operation. These zerk points serve the rotation trunnions that are adjacent to the agitator driveshaft 210, the main agitator shaft bearings, the belt tensioning pulley, the drive motor 36, and the rear-bearing sets. The mixer frame 12 preferably will be built with access openings covered by doors attached by bolts or door hinge assemblies to the frame. Similar to the frame 12, the doors may be made out of stainless steel although an acceptable alternative material may also be used.

All references, including publications, patent applications, and patents, cited herein are hereby incorporated by reference to the same extent as if each reference were individually and specifically indicated to be incorporated by reference and set forth in its entirety herein.

The use of the terms "a," "an," and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A device for mixing yeast-raised and yeast-raised type dough comprising:
    a bowl with an exterior bowl surface;
    a bowl jacket surrounding at least a portion of the exterior bowl surface;
    a V-shaped channel for carrying coolant disposed between the exterior bowl surface and the bowl jacket; and
    an agitator attached to an agitator driveshaft for mixing dough ingredients,
    the agitator including first and second spiders mounted to the agitator driveshaft and a roller bar mounted between the first and second spiders,
    the agitator driveshaft having a shaft entry passageway and shaft exit passageway and further defining a driveshaft axis about which the agitator driveshaft rotates the agitator,
    the first spider including a spider arm entry passageway connected to the shaft entry passageway,
    the second spider including a spider arm exit passageway connected to the shaft exit passageway, and
    the roller bar including a roller bar passageway between the spider arm entry passageway and the spider arm exit passageway, the roller bar being mounted for rotation about a roller axis parallel to the driveshaft axis.

2. The container of claim 1, wherein the V-shaped channel is attached to at least a portion of the exterior bowl surface.

3. The container of claim 1, wherein the V-shaped channel forms substantially a 90 degree angle.

4. The container of claim 3 further comprising insulating material disposed between the channel and the bowl jacket.

5. The container of claim 3, wherein the bowl, the bowl jacket, and the channel are made of #304 stainless steel.

6. The container of claim 3, wherein a coolant is present in the V-shaped channel and the coolant comprises a liquid.

7. The container of claim 3, wherein a coolant is present in the V-shaped channel and the coolant comprises glycol.

8. The container of claim 3, wherein the channel winds back and forth across at least a portion of the exterior bowl surface.

9. The device of claim 1 including:
    means for circulating air through an agitator cooling passageway defined by the shaft entry passageway, the spider arm entry passageway, the roller bar passageway, the spider arm exit passageway, and the shaft exit passageway.

10. The device of claim 9, wherein the air circulating means is adapted to circulate chilled air.

11. The device of claim 9, wherein the cooling passageway is tubular and the spider arm exit passageway has a diameter greater than that of the spider arm entry passageway.

12. The apparatus of claim 1 including:
    a bowl lip adjacent the top of the bowl; and
    a rod attached to the bowl, and a wiper mounted on the rod for movement lateral to the bowl to remove dough from the bowl lip.

13. The apparatus of claim 12 further comprising:
    a cover extending across the opening of the bowl with its edge disposed adjacent to the bowl lip; and a resilient, expandable bowl seal, disposed on the edge of the cover, the bowl seal comprising an inflatable bladder to seal a space between the bowl lip and the cover when the bowl seal is inflated.

14. The apparatus of claim 1 in which:
the roller bar defines a first center point;
the stretcher bar defines a second center point, the second center point being disposed a second distance substantially perpendicular to the driveshaft axis,
the second distance being about 62% to about 66% of the first distance; and
wherein an angle between the first center point and the second center point is about 30 degrees to about 40 degrees.

15. The apparatus of claim 14 in which the first and second center points are substantially in the same plane.

16. The apparatus of claim 14 in which the second distance is about 71% to about 75% of the first distance, and the angle between the first center point and the second center point is about 25 degrees to about 35 degrees.

17. The apparatus of claim 14 in which the second distance is about 80% to about 84% of the first distance, and the angle between the first center point and the second center point is about 20 degrees to about 30 degrees.

18. The device of claim 1 in which the bowl has an interior surface and a semicircular base and the agitator driveshaft is positioned a distance away from the interior bowl surface of about 72% to about 97% of the radius of the semicircular base.

19. The device of claim 1 in which the shaft entry passageway, the spider arm entry passageway and the roller bar passageway are smaller in diameter than the spider arm exit passageway and the shaft exit passageway.

* * * * *